(12) United States Patent
Bohm et al.

(10) Patent No.: US 9,193,853 B2
(45) Date of Patent: Nov. 24, 2015

(54) METHOD OF MICROBIAL AND/OR ENZYMATIC DEVULCANIZATION OF RUBBER

(75) Inventors: Georg G. Bohm, Akron, OH (US); Gregory N. Stephanopoulos, Winchester, MA (US)

(73) Assignee: APPIA, LLC, Akron, OH (US)

( * ) Notice: Subject to any disclaimer, the term of this patent is extended or adjusted under 35 U.S.C. 154(b) by 448 days.

(21) Appl. No.: 13/116,490

(22) Filed: May 26, 2011

(65) Prior Publication Data

US 2011/0301302 A1  Dec. 8, 2011

Related U.S. Application Data

(60) Provisional application No. 61/352,543, filed on Jun. 8, 2010.

(51) Int. Cl.
*C08F 36/00* (2006.01)
*C08L 21/00* (2006.01)
*C08J 11/10* (2006.01)
*C08L 19/00* (2006.01)

(52) U.S. Cl.
CPC ............... *C08L 21/00* (2013.01); *C08J 11/105* (2013.01); *C08J 2319/00* (2013.01); *C08J 2321/00* (2013.01); *C08L 19/00* (2013.01); *Y02W 30/702* (2015.05)

(58) Field of Classification Search
USPC ............ 521/41, 42, 43, 44.5, 41.5; 525/331.9
See application file for complete search history.

(56) References Cited

U.S. PATENT DOCUMENTS

| | | | |
|---|---|---|---|
| 4,104,205 | A | 8/1978 | Novotny et al. |
| 5,284,625 | A | 2/1994 | Isayev et al. |
| 5,591,926 | A | 1/1997 | Inada et al. |
| 5,597,851 | A | 1/1997 | Romine et al. |
| 5,602,186 | A | 2/1997 | Myers et al. |
| 5,798,394 | A | 8/1998 | Myers et al. |
| 5,891,926 | A | 4/1999 | Hunt et al. |
| 6,380,269 | B1 | 4/2002 | Benko et al. |
| 6,407,144 | B1 | 6/2002 | Fliermans et al. |
| 6,420,457 | B1 | 7/2002 | Wicks et al. |
| 6,479,558 | B1 | 11/2002 | Fliermans |
| 6,992,116 | B2 | 1/2006 | Benko et al. |
| 7,388,033 | B2 | 6/2008 | Nagy et al. |
| 7,425,584 | B2 * | 9/2008 | McFarlane et al. ............. 521/41 |
| 2006/0293398 | A1 * | 12/2006 | Christofi et al. ................ 521/41 |
| 2008/0139678 | A1 * | 6/2008 | Fan et al. ........................ 521/43 |

OTHER PUBLICATIONS

Hal Alper, Gregory Stephanopoulos, "Global transcription machinery engineering: A new approach for improving cellular phenotype," Metabolic Engineering, vol. 9, Issue 3, May 2007, pp. 258-267.

* cited by examiner

*Primary Examiner* — Monique Peets
(74) *Attorney, Agent, or Firm* — Dureska, Kennedy & Moore, LLC; Brent L. Moore; David P. Dureska

(57) ABSTRACT

A method for microbial and/or enzymatic devulcanization of rubber includes: providing a particulate vulcanized rubber compound, swelling the vulcanized rubber compound in a solvent, and introducing a microbe or enzyme into the solvent containing the particulate vulcanized rubber in order to devulcanize the rubber compound.

19 Claims, 1 Drawing Sheet

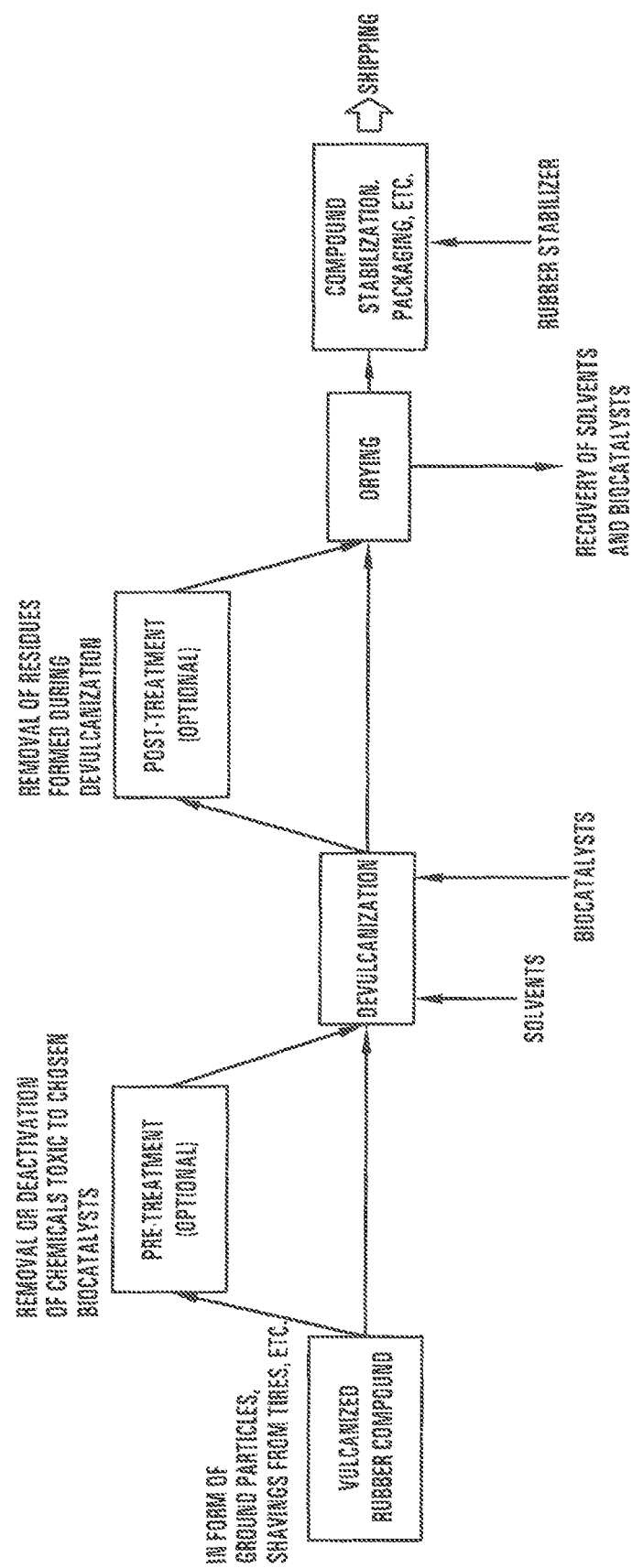

METHOD OF MICROBIAL AND/OR ENZYMATIC DEVULCANIZATION OF RUBBER

CROSS-REFERENCE TO RELATED APPLICATION

This application claims the benefit of U.S. Provisional Patent Application No. 61/352,543, filed Jun. 8, 2010.

BACKGROUND OF THE INVENTION

1. Field of the Invention

The invention relates generally to the treatment of sulfur-cured or sulfur vulcanized rubber compounds by chemical and/or biochemical means in order to allow reuse of the sulfur-cured rubber compounds without appreciable loss in performance of the resulting rubber compound. More particularly, the invention is directed to a method, and product thereof, for devulcanizing sulfur-cured rubber compounds that utilizes an organic solvent to swell the vulcanized rubber compound combined with the introduction of microbes and/or enzymes which break the sulfur-sulfur (S—S) and sulfur-carbon (S—C) bonds of the vulcanized rubber compound in order to devulcanize the rubber compound.

2. Background Art

The rubber compounds used in vehicle tires are composite materials that include polymers such as natural rubber or synthetic rubbers that have been blended with a variety of additives such as sulfur and fillers such as carbon black or silica. The tire is molded into the basic circular shape and then cured. The curing process of the tire is well known in the industry as vulcanization and results in the creation of a three dimensional network of sulfur cross-links which link the various polymer chains to form a dimensionally stable thermoset composite which cannot be reshaped once it has been formed and cured. As a result, the recycling and reuse of vulcanized rubber products, such as worn rubber tires, is difficult because the vulcanized rubber cannot be reshaped or simply reconstituted by dissolving it in a solvent in order to form the vulcanized rubber into a new shape.

However, because of the ever increasing cost of oil derived raw materials such as synthetic rubbers and carbon black fillers, there is considerable interest in the reuse of products such as worn vulcanized rubber tires made from these materials. Millions of used tires and other rubber products are discarded annually and only a minor fraction of them are used in any manner. The small amount that are reused are usually first broken up to remove the non-rubber components of the tire, such as the steel cords, beads etc., and the remaining rubber compound is ground-up into rubber particles of different sizes for use in a wide variety of applications, such as synthetic turf for football, soccer, and other sport related playing surfaces. Additional applications of these ground-up vulcanized rubber particles include use of the products in molded or extruded materials such as floor mats etc. Reuse of the vulcanized ground rubber particles in high performance products such as tires is limited to exceedingly small quantities because the ground rubber particles adversely affect key properties vital to the performance of the end product.

More particularly, these adverse affects result because the vulcanized ground rubber particles do not dissolve in the fresh rubber compounds on a molecular scale but they stay intact and act as defects once the product is processed by molding and vulcanization of the new composition. There are two types of defects that typically result from incorporating the vulcanized ground rubber particles into fresh rubber compounds. The first relates to a defect generated because of poor bonding between the ground rubber particles and the fresh new matrix rubber and arises mainly because of insufficient molecular interdiffusion. Therefore, when stress is applied to the resulting end product, small gaps will form where the new matrix fresh rubber polymer separates from the vulcanized ground rubber particle which will subsequently grow into larger propagating cracks and ultimately cause failure. The second type of defect arises because the vulcanized ground rubber particles generally will have a much higher cross-link density in the final product than the fresh new matrix rubber. More specifically, some of the sulfur and cure accelerators added to the fresh compound for vulcanization will diffuse into the ground rubber particles during the mixing, shaping and vulcanization steps, and cause the vulcanized ground rubber particles to experience a second vulcanization. The second vulcanization results in a much higher crosslink density, a higher modulus and a significantly lower extension to break in the ground rubber phase. Thus, when the final product is deformed during use, premature failure will occur in the ground rubber particles because this phase will reach conditions to failure at a much lower strain compared to the new matrix rubber phase. Micro-cracks formed in the process will at first propagate through the particle and then continue to propagate through the product causing it to fail during use. These defects manifest themselves even at relatively low vulcanized ground rubber concentrations resulting in a reduced tensile strength, poor cut growth performance and reduced wear. Therefore, there is a great reluctance on the part of many tire manufacturers to incorporate tire buffings and ground rubber particles from whole tires into fresh tire compounds due to the problems described above.

Recognizing these limitations that the vulcanized state of ground rubber has on many different applications, many different processes have been explored to devulcanize ground rubber prior to its use. The overall objective of the devulcanization process is to break up the S—S (sulfur-sulfur) and C—S (carbon-sulfur) bonds originally formed during vulcanization and to remove or deactivate the chemicals involved in the first vulcanization process as well as during the devulcanization so that they cannot initiate any new cross-links during subsequent use of the devulcanized particles in the fresh rubber compounds. Moreover, it is imperative that the devulcanization process does not involve any breakage of main chain carbon-carbon (C—C) links as this will reduce the molecular weight of the rubber in the ground rubber particles and significantly affect the performance of the compositions comprising the devulcanized rubber. The prior art patents listed below describe different approaches for devulcanization ranging from the use of ultrasonic and microwave exposure to the treatment with certain chemicals or bio-chemical agents. However, no devulcanization process has at present proven to be technically or commercially viable on a large scale.

U.S. Pat. No. 5,284,625 discloses a continuous ultrasonic method for breaking the carbon-sulfur, sulfur-sulfur and, if desired, the carbon-carbon bonds in a vulcanized elastomer. Through the application of certain predetermined levels of ultrasonic amplitudes and the presence of pressure and optional heat, it is reported that cured or vulcanized rubber can be broken down. Using this process, the rubber becomes soft, thereby enabling it to be reprocessed and reshaped in a manner similar to that employed with previously uncured elastomers.

U.S. Pat. No. 4,104,205 discloses a means to devulcanize sulfur-vulcanized elastomers comprising polar groups which includes exposure to microwave energy of between 915 and 2450 megahertz and between 41 and 177 watt-hours/pound sufficient to break substantially all C—S and S—C bonds and insufficient to break up the C—C bonds.

U.S. Pat. No. 6,420,457 sets forth a process and a resulting product of the process in which a vulcanized solid particulate, such as vulcanized crumb rubber, has select chemical bonds broken by microwave radiation. The direct application of microwaves in combination with uniform heating of the crumb rubber renders the treated crumb rubber more suitable for use in new rubber formulations. As a result, larger particle sizes and/or living levels of the treated crumb rubber can be used in new rubber mixtures to produce recycled composite products with good performance properties.

U.S. Pat. No. 6,380,269 discloses a process for devulcanization of the surface of reclaimed rubber crumb into surface devulcanized reclaimed rubber crumb that is suitable for being re-compounded and recurred into high performance rubber products. The process includes the steps of heating the reclaimed rubber crumb to a temperature which is within the range of about 150° Celsius to about 300° Celsius under a pressure of at least about $3.4 \times 10^6$ Pascal, in the presence of 2-butenol to devulcanize the surface of the rubber crumb thereby producing a slurry of the surface devulcanized reclaimed rubber crumb in the 2-butenol, wherein the reclaimed rubber crumb has a particle size which is within the range of about 325 mesh to about 20 mesh. The surface devulcanized reclaimed rubber crumb is then separated from the 2-butenol.

U.S. Pat. No. 5,602,186 discloses a process for devulcanizing cured rubber by de-sulfurization which includes the steps of: contacting rubber vulcanized crumb with a solvent and an alkaline metal to form a reaction mixture, heating the reaction mixture in the absence of oxygen and with mixing to a temperature sufficient to cause the alkaline metal to react with the sulfur and the rubber will vulcanize, and maintaining the temperature below that at which the thermal cracking of the rubber occurs, thereby devulcanizing the rubber vulcanizate. The patent indicates that it preferred to control the temperate below about 300° Celsius or where thermal cracking of the rubber is initiated.

U.S. Pat. No. 7,425,584 relates generally to the devulcanization of rubber. More specifically, the invention relates to a process for the hydro-devulcanization of vulcanized rubber utilizing a rubber swelling solvent, a source of reactive hydrogen and elevated temperature and, optimally, also uses a disbursed molecular-scale hydrogenation catalyst that is introduced into the vulcanized rubber and a catalytically inert form that is soluble in the rubber swelling solvent.

U.S. Pat. No. 5,891,926 discloses a process for devulcanizing cured rubber into devulcanized rubber that is capable of being re-compounded and recurred into useful rubber product and for extracting the devulcanized rubber from the cured rubber. The process includes: heating the cured rubber to a temperature which is within the range of about 150° Celsius to about 300° Celsius under pressure of at least about $3.4 \times 10^6$ Pascal in 2-butenol in order to devulcanize the cured rubber into devulcanized rubber, thereby producing a mixture of solid cured rubber, solid devulcanized rubber and a solution of the devulcanized rubber in the 2-butenol, removing the solution of the devulcanized rubber from the solid cured rubber and the solid devulcanized rubber, cooling the solution of the devulcanized rubber in the 2-butenol to a temperature of less than about 100° Celsius and separating the devulcanized rubber from the 2-butenol.

U.S. Pat. No. 5,597,851 sets forth a method of using enzymes from thiophilic microbes for selectively breaking the sulfur rubber crosslink bonds in vulcanized rubber. The process is halted at the sulfoxide or sulfone step so that a devulcanized layer is reactivated with virgin rubber.

U.S. Pat. No. 6,407,144 sets forth a process and product where a vulcanized solid particulate, such as vulcanized crumb rubber, has select chemical bonds altered by biotreatment with thermophilic microorganisms selected from natural isolates from hot sulfur springs. Following the bio-treatment, microwave radiation is used to further treat the surface and to treat the bulk interior of the crumb rubber. The resulting combined treatments render the treated crumb rubber more suitable for use in new rubber formulations. As a result, larger loading levels and sizes of the treated crumb rubber can be used in new rubber mixtures and good performance properties are obtained from the new recycled products.

U.S. Pat. No. 6,479,558 describes a process and resulting product where a vulcanized solid particulate, such as vulcanized crumb rubber, has selected chemical bonds broken by bio-treatment with hemophilic microorganisms selected from naturally occurring isolates derived from hot sulfur springs. The bio-treatment of the crumb rubber renders the treated crumb rubber more suitable for use in new rubber formulations. As a result, larger loading levels and sizes of the treated crumb rubber can be used in new rubber mixtures.

While microbes have been used before for the devulcanization of vulcanized rubber crumb, the rates observed are impractical for industrial applications and any devulcanization observed was limited to a very thin surface layer of the treated ground rubber particles. At least three factors are responsible for this: 1) a slow and very shallow penetration of the biological agents (microbes and/or enzymes) into the bulk of the particle, 2) slow rates of the devulcanization reactions, and 3) a partial deactivation of the biological agents by certain chemical compounds present in the ground rubber particle. These problems are described in greater detail below.

The first problem originates from the difficulty that microbes and enzymes have in diffusing into the filler reinforced sulfur cross-linked polymeric matrix of the vulcanized rubber compound in order to catalyze the sulfur oxidation reaction. This is due in part to the essentially hydrophilic nature of microbes and enzymes which are generally incompatible with the mostly hydrophobic elastomers used in cured rubber compounds. Therefore, the hydrophilic microbes and enzymes have a very small mutual solubility in the vulcanized crumb rubber particle. Moreover, any interdiffusion of the microbes/enzymes into the sulfur cross-linked polymeric matrix of the vulcanized rubber crumb particles is also effected by the de facto pores which were formed during the vulcanization of the product from which the ground rubber particles were produced. At that time, the rubber molecules existed in the form of coiled structures which became linked to each other through sulfur cross-links with the average molecular weight between cross-links generally being about 10 kilograms/mole. The resulting fisherman-like net acts as a potential barrier to interdiffusion of the microbes/enzymes into the sulfur cross-link polymeric matrix of the vulcanized rubber crumb particles because the net size is often smaller than the dimensions of most microbes (about 1-30 micrometers). The second problem relates to the use of microbes and enzymes which only show a limited activity toward sulfur. With regard to the third issue it is generally known that certain chemicals such as zinc oxide, 2-mercaptobenzothiozole (MBT) and others added to rubber compounds as stabilizers or to facilitate and control the vulcanization process are toxic to many microorganisms.

Because of the problems set forth above, no devulcanization process which utilizes microbes and/or enzymes at present has proven to be technically or commercially viable on a large scale in order to devulcanize crumb rubber so that it can be readily combined with new rubber without a significant loss in product performance.

The present invention overcomes the problems associated with prior art microbial and/or enzymatic devulcanization methods by providing a process and the resulting product of the process in which a previously vulcanized rubber may be incorporated into new polymer compositions for tires and other products at much greater levels than used before in the prior art without any significant loss in product performance. More specifically, the present invention provides a method for devulcanizing a previously sulfur vulcanized rubber compound which includes treatment of the vulcanized ground rubber compound to reduce or break up all chemical bonds between sulfur (S—S) and sulfur and carbon (S—C) atoms and to deactivate or remove all or some of the active chemical residue generated by the initial vulcanization and the devulcanization step from the rubber particles. The treatment involves exposure of the vulcanized rubber matrix to certain enzyme releasing microbes or microorganisms, or such enzymes by themselves, which react with and break up the S—S and S—C bonds of the vulcanized rubber crumb in the presence of an organic solvent which swells the vulcanized rubber crumb particles but does not interfere with the biological activity of the microbes, microorganisms or the enzymes chosen. The method for microbial and/or enzymatic devulcanization of rubber of the present invention overcomes the problems associated with prior devulcanization methods that utilize microbial or enzymatic agents set forth above by providing a method for devulcanization of vulcanized rubber crumb that ensures that every part of the ground rubber particle will be exposed to the microbe and/or enzyme and thus devulcanized. Therefore, the method of microbial and/or enzymatic rubber devulcanization of the present invention causes most S—S and S—C bonds to be broken in the rubber crumb, resulting in a rubber composition that can easily be combined in large quantities with fresh rubber compound with a uniform dispersion of the rubber as well as the filler particle content of the devulcanized rubber particles in fresh rubber compound on a molecular scale.

SUMMARY OF THE INVENTION

Objectives of the present invention include providing a process for microbial and/or enzymatic devulcanization of rubber and the resulting product of the process in which a previously vulcanized rubber may be incorporated into new polymer compositions for tires and other products at much greater levels than used before in the prior art without any significant loss in product performance.

Another objective of the present invention includes providing a method for devulcanization of vulcanized rubber crumb that ensures that every part of the ground rubber particle will be exposed to the microbe and/or enzyme and thus devulcanized.

Yet another objective of the present invention includes providing a method for devulcanization of vulcanized rubber crumb that results in a rubber composition that can easily be combined in large quantities with fresh rubber compound with a uniform dispersion of the rubber as well as the filler particle content of the devulcanized rubber particles in fresh rubber compound on a molecular scale.

These objectives and advantages are obtained by the method of microbial or enzymatic devulcanization of rubber including providing a particulate vulcanized rubber compound; swelling the particulate vulcanized rubber compound in a solvent; and introducing a microbe or enzyme into the solvent containing the particulate vulcanized rubber compound in order to devulcanize the compound.

BRIEF DESCRIPTION OF THE SEVERAL VIEWS OF THE DRAWINGS

The preferred embodiments of the invention, illustrative of the best mode in which applicants have contemplated applying the principles of the invention, are set forth in the following description and are shown in the drawings, and are particularly and distinctly pointed out and set forth in the appended claims.

FIG. 1 is a schematic representation of a preferred embodiment method for microbial and/or enzymatic devulcanization of rubber of the present invention.

DESCRIPTION OF THE PREFERRED EMBODIMENT

A method for microbial and/or enzymatic devulcanization of rubber includes the following steps which are shown in FIG. 1 and described generally below and which are further illuminated by the specific examples which follow.

Previously sulfur-vulcanized compounds diminuated into tire buffings during re-treading or converted into small particles by grinding or shaving of whole tires as part of a tire recycling operation are treated to reduce or break up all chemical bonds between sulfur atoms (S—S) and sulfur and carbon atoms (S—C) and to deactivate or remove all or some of the active chemical residue generated from the rubber particles by the initial vulcanization and the devulcanization step. In a first preferred embodiment of the present invention, a vulcanized rubber compound, for example from a tire, is ground or shaved into a fine mesh to form a plurality of particles. It is preferred that the particles are less than or equal to about 1000 microns in diameter. The ground vulcanized rubber compound is then placed into a solvent or combination of solvents which swell the particles. At least one microbe and/or enzyme is then introduced into the mixture of vulcanized rubber particles and solvent. The microbe and/or enzyme can be chosen or developed through one of the processes set forth below. The microbe and/or enzyme devulcanizes the rubber in the entire particle by reacting with and breaking up the S—S and S—C bonds throughout the entire matrix of the vulcanized rubber particle. The solvent, or combination of solvents, are chosen to provide a significant swelling of the particles but not to interfere with the biological activity of the microbes and/or the enzymes being utilized for the devulcanization step. Depending on the specific conditions used, the process causes all sulfur bonds to be broken in which case the rubber and filler content of the particle can be fully disbursed in a fresh rubber compound on a molecular scale. Alternatively, a small portion of the sulfur bonds can be left intact so that the particle retains its shape in the new compound but its cross-linked density is sufficiently reduced so that there is only a minimum difference in the state of cure between particle and host matrix when the composite is vulcanized later on. As a result, the physical properties, including the extension to break in the two phases, is near equal and no premature crack development will occur under those conditions.

The catalytic activity of microbes and the enzymes developed for this process are typically sensitive to temperature. Accordingly, it is preferred that when the microbes and/or enzymes are present, the temperature is maintained at a level of optimum biological activity of the microbe and/or the enzyme or within the range of above freezing to below the boiling temperature of water at one atmosphere of pressure. It is most preferred to conduct microbe and/or enzymatic devulcanization at a temperature of about 25° C. to about 100° C.

Devulcanization is halted upon conversion of the sulfur bonds to sulfoxide (R—SO—R) or sulfone groups (R—SO2-R). To determine when to stop the reaction, samples may be analyzed by infrared spectroscopic, solvent swelling measurements, and other methods which can detect changes in crosslink density or reaction products formed, all of which are indicative of the degree of devulcanization accomplished. The conversion is halted by removing the rubber particles and rinsing them to remove all the remaining microbes and/or enzymes and other waste products. After the devulcanized rubber crumb is dried, it may be added to virgin rubber compounds to form a new product.

In another embodiment of the method of microbial and/or enzymatic devulcanization of rubber, an optional pre-treatment step is performed on the ground vulcanized rubber compound prior to the introduction of the devulcanization step, as schematically shown in FIG. 1. This optional pretreatment step removes additives from the ground vulcanized rubber compound that might interfere with microbial and/or enzymatic devulcanization of the vulcanized rubber compound. More particularly, this optional pre-treatment step removes or deactivates additives present in the vulcanized rubber compound, such as zinc oxide, vulcanization accelerators such as 2-mercaptobenzothiazole (MBT), and the like, that could potentially be toxic to the microbes and/or enzymes utilized in the devulcanization of the vulcanized rubber compound.

In yet another embodiment of the method of microbial and/or enzymatic devulcanization of rubber, an optional post-treatment step is performed after devulcanization of the vulcanized rubber compound and before drying of the devulcanized rubber compound, as schematically shown in FIG. 1. This optional post-treatment step removes residues formed during the devulcanization step. These residues include byproducts of the microbial and/or enzymatic devulcanization of the vulcanized rubber compound which could potentially interfere with the vulcanization of the devulcanized rubber compound when incorporated into the new rubber compound during later processing There are at least four key advantages of this method over processes and methods covered in prior art patents. The first is that not only is the surface of the vulcanized crumb rubber particles being exposed to the biochemical agents, but every part of the ground rubber particles is susceptible and affected by the bio-agent. This is extremely significant as it was pointed out earlier that the major reason for the reduced performance of compounds comprising ground rubber particles is the difference in the crosslink density between the ground rubber particle and the host matrix in which they are embedded. Hence unless the devulcanization occurs throughout the particle and not only at the surface no significant benefit can be derived from the devulcanization step. The second is that microbes and enzymes are being developed specifically for this process which have a significant specific activity toward a devulcanization without being affected by the solvent selected for this process. Thirdly, larger ground rubber particles can be used as the devulcanization occurs throughout the particle and the material is then dispersed in fresh compound on a molecular scale. In prior art processes, where the devulcanization is limited to a very thin surface layer, very fine particles are needed to minimize the performance loss of ground rubber comprising compounds. Yet, smaller particles are more expensive to prepare and tend to have a more degraded microstructure due to excessive heating during fine grinding. Finally, the deactivation of the biological agents by toxic chemical present in the ground rubber can, where necessary, be minimized by a pretreatment of the ground rubber prior to the devulcanization treatment. This can involve a solvent based removal of the chemicals or by a bacterial detoxification of the particles in the solvent imbibed state. *Rhodococcus rhodochrous*, for example, is known to break down or biotransform MBT and other microbes can be selected and optimized to target other chemicals as may be advisable to make the devulcanization process efficient for industrial use.

More specifically, the method of microbial and/or enzymatic devulcanization of rubber of the present invention utilizes solvents that significantly expand the network structure of the vulcanized crumb rubber by swelling. Solvent swelling of vulcanized rubber compounds has been amply demonstrated in the scientific literature. Typical tread stock used in tires and placed in a good solvent such as toluene will imbibe large quantities of the solvent (Weight$_{swollen}$/Weight$_{dry}$>3). By absorbing such large solvent quantities the ground rubber particles are greatly expanded in volume, the rubber chains between crosslinks become greatly extended and the microbes and enzymes are provided with a low viscosity carrier fluid that greatly facilitates the diffusion of enzymes as well as small microbes through the entire ground rubber particle. In another embodiment of the present method for microbial and/or enzymatic devulcanization of rubber, a combination of enzymes and microbes are chosen such that the smaller enzymes easily penetrate the solvent swollen network, catalyze the devulcanization and thus enlarge the net size. This in turn allows the larger microbes to follow the path of the advancing enzymes to release more enzymes capable of devulcanization.

Therefore, the method for microbial and/or enzymatic devulcanization of rubber of the present invention includes pretreatment of the ground rubber particles with a solvent or mixture of solvents such as hexane, toluene, and benzene, or other like solvent, and optionally in combinations with more polar solvents such as water or the like will eliminate diffusional resistances for enzymatic and/or microbial action. The biocatalyst must be capable of retaining its bio-activity in the presence of such solvents, because hydrophobic solvents of the type referred to above are generally toxic to living cells as they accumulate in and disrupt the cell membranes.

It is contemplated that development of optimal biocatalysts for use in the method for microbial and/or enzymatic devulcanization of rubber could be accomplished as follows: 1) Evolution of enzymes or microbes that preserve the bio-catalytic activity toward sulfur in the selected solvent, 2) Evolution of enzymes and microbes that show a high rate of devulcanization, and 3) Utilization of high throughput screens to identify promising mutant enzymes and microbes developed under 1 and 2. Each of these developments is described in detail below.

The possible toxicity of the solvent to the biocatalyst can be overcome by several methods such as, applying directed evolution to a sulfur-oxidizing enzyme to increase its activity in the presence of the solvents. The ability to evolve enzymes artificially in order to make them more resistant to various toxic compounds such as solvents has been amply demonstrated before and studies have shown that enzymes, properly mutated, can remain active in environments with high solvent concentrations. In the present application, the original sulfur-oxidizing enzyme is randomly mutated at the genetic level and mutants are selected that are functional in the presence of the solvent. Since the latter inactivates the wild type, and most mutant enzymes, selection of the desired mutants is accomplished by isolating those mutants exhibiting good bio-activity in the presence of increasing solvent concentrations in a high throughput screen following methods of directed evolution.

When whole cells are used as biocatalysts, the issue of toxicity may be solved through methods of Transcriptional Engineering. Here, a targeted transcription factor (TF) is mutated and the resulting mutants exposed to increasing concentrations of the solvent. Cells that survive the high solvent concentrations are isolated easily and analyzed to identify the specific mutant transcription factor that elicits the tolerance to the high solvent concentration. Such mutant TF is retransformed in the original strain to yield one with increased tolerance that can thus be employed for devulcanization under industrial conditions.

High throughput screens are applied to identify promising mutants artificially created in the laboratory through methods such as error-prone PCR (Polymerase Chain Reaction), gene shuffling and the like. These methods can also be applied to the isolation of promising cultures from natural sources, as well as the enzymes secreted by such cultures. In one such application, samples from a variety of natural environments are cultivated in rich media and then transferred for conditioning, to media containing model sulfur compounds of a similar nature as the ones that are sought to be oxidized in the vulcanized rubber. Samples are gathered from habitats that are close to decaying old rubber tires as they have a higher probability of containing microbes that naturally evolved to derive energy from the oxidation of the sulfur and the rubber compound and thus possess better devulcanization properties. Another such source of cultures is soil that has come into contact with high sulfur containing petroleum products. It is likely that such soil samples contain biological agents better adapted to sulfur oxidation and hence contain more active enzymes for this purpose. After conditioning for a number of days, these cultures are applied on actual ground rubber particles spotted on the panel used for high throughput screens. Spots that show a fast rate of degradation are isolated and the organisms/enzymes are then analyzed for further characterization.

If the devulcanizing catalyst is an enzyme, then the same methods that are used for increasing its solvent tolerance, i.e., random mutations and a directed evolution scheme, can also be applied to identify mutants with increased activity and the high throughput assay is employed along the lines set forth above for microbes.

Sulfur oxidizing enzymes are typically not available in a pure form to be used directly with the present invention. However, sulfur oxidizing enzymes are available in a preparation which can be obtained from the secretion of a devulcanizing organism. As a result, they are typically more active in a non-purified form, as mixtures with other enzymes. The latter is identified by assaying for fast decomposition of ground rubber particles and isolating the media surrounding the microbes that proliferate under conditions of fast decomposition. Such media can be subjected to chromatographic analysis to identify the main proteins that are contained in the created media. By testing each of the protein components in such media, the most active ones against sulfur oxidation can be identified, cloned, and characterized bio-chemically.

Another method by which the rate of devulcanization by microbes can be enhanced is through the expression in a basic organism of additional genes coding for sulfur oxidizing enzymes. The latter can be obtained from genes that have already been identified in the literature or from the ones isolated by the procedure described above. To identify additional gene targets, bioinformatic methods can be applied. In this approach, sequence homology analysis is carried out among several known sulfur oxidizing enzymes to identify sequence motifs characteristic of the sulfur oxidizing activity. Using these motifs as a probe, the genomes of other organisms are subsequently searched in order to identify open reading frames (ORFs) with high homology to the identified sequences. Such ORFs have high probability to possess devulcanizing activity and then are tested to confirm the same. Genes identified by these methods can provide a very convenient starting point in the overall effort of enzyme identification. In many ways, they are preferable to the biochemical approaches that depend on the chromatographic separation, purification, cloning, and expression of the gene, steps which are tedious and slow.

A critical element in isolating the above enzyme and microbial mutants is the availability of a high throughput screen that allows for a fast evaluation of a large number of mutant enzymes and microbial cells with respect to their ability to oxidize sulfur links of the polymeric matrix. More particularly, the extent of devulcanization of the rubber compound is determined via high throughput screening by measuring the amounts of the reaction products generated from the devulcanization, such as sulfates, etc., or by using imaging techniques which detect the increased solvent swelling resulting from the reduced cross-link density due to the devulcanization process. For example, a panel containing hundreds or thousands of small spots of rubber particles treated with samples of different enzymatic and cell mutants is utilized to identify the spot that changes configuration (based on the assay) faster over a specified period of time. This greatly facilitates the identification of valuable mutants that catalyze fast devulcanization. Several options exist to detect which of the mutant biocatalysts preserve their activity in the solvents of choice and also show a superior devulcanization activity.

One approach is to measure the sulfate concentration in the culture supernatant as it is the product of sulfur oxidation and the devulcanization process. Hence, a fast accumulation is indicative of a rapid break-up of the sulfur linkages in the rubber sample.

Another means is to measure the change in sample dimensions when imbibed with solvent. Since the equilibrium solvent uptake is governed by the cross link density of the sample, any loss in cross links caused by devulcanization would manifest itself in an increased solvent uptake and thus in an increase in sample size. Of course, other optical or electrical response changes can also be considered.

EXAMPLE(S)

An example of the method for microbial and/or enzymatic devulcanization of rubber is described in detail below.

Example 1

Enzymatic Methods

The method for microbial and/or enzymatic devulcanization of rubber of the present invention includes multiple steps such as, preparing an enzymatic solution comprising a single enzyme or mixtures of enzymes, mutating randomly or in a targeted manner such enzymes for the purpose of enhancing their activity and/or tolerance to the solvent environment in which such enzymes are exposed, selecting enzymes with improved properties using high throughput screens, and, finally, exposing vulcanized rubber, in some pretreated form, to such an enzyme capable of attacking sulfur bonds within the rubber polymer layers.

The following general process steps are part of the disclosed invention: 1) Enhancing protein (i.e., enzyme) stability and activity by protein evolution techniques for developing enzymes of improved activity and stability in the solvent(s) environment used to soften ground rubber for devulcanization in which the breaking of S—S bonds by the enzyme(s) will take place; 2) Protein evolution for greater affinity towards the sulfur bonds and product specificity; and 3) Exploring different enzyme cocktails for optimization of the process. This is so because enzyme mixtures may have increased potential and higher effectiveness in their devulcanization properties than their corresponding single enzyme preparations.

Items 1 and 2 above are pursued by generating mutant enzymes and screening such mutants in a high throughput manner using the following general protocols.

Genomic DNA is isolated from a particular enzyme that has shown some initial activity for devulcanization and cloned into a plasmid vector for expression in a host cell useful for molecular biology manipulations, such as, but not limited to, the bacterium *Escherichia coli*, or other such similar host cell. If this is a non-native enzyme to *E. coli*, care will be taken to carry out all necessary steps for its proper expression in *E. coli*, or the selected host organism, such as optimization of codon sequences in order to favor codons preferred for expression by native proteins of *E. coli* or the host cell. Standard vectors known for satisfactory expression in *E. coli*, will be used, such as pSC101, pUC19, pACYC184, and M13 mp18 and expression will be driven by constitutive as well as inducible promoters. The following are examples of promoters that will be used for the expression of the selected candidate enzyme sequences: T7 promoters, lac promoters, bacteriophage T5 strong promoter (PT5), *Acinetobacter* sp. chnB promoter, Pm/xylS promoter, and others.

Mutations of enzymes will be introduced in order to generate variants with improved properties using the following example methods.

a) Chemical means such as submitting the genomic DNA of the selected enzyme to random mutagenesis with alkylating agents such as ethyl methane sulfonate (EMS), and/or Nitrosoguanidine (NTG), or hydroxylamine. The mutant nucleic acid constructs will be expressed in the host cell.

b) Error Prone PCR (polymerase chain reaction), whereby, 15 base primers flanking the gene and promoter will be synthesized and placed in the reaction mixture with Taq DNA polymerase, a DNA polymerase that is prone to errors during the polymerase chain reaction, and a Mg2+ buffer. After the PCR reaction, the PCR product will be purified and ligated to a plasmid and transformed into competent *E. coli* for expression.

c) Transforming the plasmid vector carrying the enzyme into mutator *E. coli* strains like XL1-red that is deficient in three DNA repair pathways thereby increasing the mutation rate of host genes many thousand-fold compared to wild-type *E. coli*.

d) Other methods may be used, such as: UV irradiation, Sequence Saturation Mutagenesis (SESAM), DNA Shuffling, Nucleotide exchange and excision technology (NExT), Staggered Extension Process (StEP), Recombination-dependent exponential amplification PCR (RDA-PCR), Random Chimeragenesis on Transient Templates (RACHITT), Recombined Extension on Truncated Templates (RETT), Mutagenic and Unidirectional Reassembly Method (MURA), Multiplex-PCR-Based Recombination (MU-PREC), Random-Priming in vitro Recombination (RPR), In vitro Heteroduplex Formation and in vivo Repair, Synthetic Shuffling or Assembly of Designed Oligonucleotides (ADO), Degenerate Oligonucleotide Gene Shuffling (DOGS), and others.

Mutant enzymes so generated will be extracted and purified. To facilitate the purification step, genes encoding for the target enzymes, and mutants of such target enzymes, will be extended with so called His tags, encoding Histidine-rich regions. The latter are used for attachment of the expressed enzymes in the packing of specialized columns and thus facilitate their separation and purification from the complex mixture of other cellular proteins. After purification, screening of desired mutants follows, utilizing one of the methods (but not limited to) set forth below.

a) Assessing S—S oxidation reaction progress on softened vulcanized rubber crumbs of uniform size in 96 well plates and under ideal conditions for enzyme activity. Screening shall be achieved either by chemical (HPLC), optical (OD), or visual (e.g. changing color dye) means. In this type of screening application, reaction products are measured in each well using methods of liquid chromatography (HPLC), colorimetric methods whereby the concentration of the product creates different color, and other analytical methods typically used by those skilled in the art. Additional screening method, that has the potential to be implemented under high-throughput manner, is the selection of mutants that release high sulphate concentrations, measured by simple acidity (pH) measurements on 96- or 354-well plates. The same method can be implemented using spotted arrays with a different enzyme mutant in each spot.

b) Repeat the above procedure under realistic industrial conditions. This can be done with the initial reaction mixture or already isolated mutants.

c) Assessing solvent tolerance by detecting the S—S oxidation activity on model compounds and also actual rubber crumbs of the different mutant enzyme variants in 96 well plates. Such plates should contain industrial solvents and their mixtures under actual industrial conditions. Screening shall be achieved as described above.

d) High throughput screening as described above, but where all procedures are handled by robot action, possibly in large trays of 96 well plates.

The method described above uses separation and purification of expressed mutants from the recombinant host cell. In another embodiment of the present invention, no separation is involved but the secreted enzyme or mixture of enzymes is directly applied to the wells used for screening. In this case, care is taken to apply at most a single cell per well such that promising mutants can be traced back to the genomic variant harbored by such cell to allow for easy identification of the genetic characteristics of the mutant.

In order to achieve goal 3 set forth above for exploring different enzyme cocktails for optimization of the process, mixtures or pre-purified enzymes prepared as indicated above will be prepared and screened as indicated. Additionally, enzyme mixtures may be generated by cultivating mixtures of mutant cells, each of which may be secreting a different mutant enzyme. Such mixtures will be applied to the screen for isolating promising mixtures of mutants. Individual enzymes of desired activity will be isolated from such mixtures by fractionation of the enzyme mixture and activity testing of each fraction. Alternatively, the mixture may be applied in an industrial setting without prior characterization of its components.

Example 2

Engineering Thiophyllic Microbes for Enhancing their Activity and Tolerance

In another preferred embodiment of the present invention, intact cells are used for the devulcanization reaction. Such special thiophyllic microbes typically release enzymes useful for breaking sulfide bonds on a vulcanized rubber particle at economically relevant quantities and rates. These microbes as well as the enzymes they produce may be sensitive to pH, temperature, and the medium/solvent(s) used to soften the rubber particles. Additionally, they may exhibit sensitivity to compounds released during devulcanization. It is therefore important to engineer such microbes in order to improve the overall number of sulfide bonds broken as well as improving the rate of the reaction. Furthermore, engineered microbes will exhibit higher tolerance to the conditions of the devulcanization environment, which are typically toxic to most cells. This may be accomplished by both engineering pathways of the microbes to enhance their specific rate of thiophyllic enzyme production and release, and by making the organisms more resistant to the specific environment in which they are growing (ground rubber particles in solvent). The following methods below can be deployed for achieving this objective.

a) Use of the technology of global Transcriptional Machinery Engineering (gTME) for developing the type of diversity that is most relevant to the desired phenotypes of tolerance and activity. Methods are described in Hal Alper, Gregory Stephanopoulos; "Global transcription machinery engineering: A new approach for improving cellular phenotype," Metabolic Engineering, Volume 9, Issue 3, May 2007, Pages 258-267. Briefly, this method targets one of the principal sigma factors for mutagenesis leading to the construction of bacterial libraries comprising cells harboring mutants of such sigma factors. The principal sigma factor encoded by the rpoD gene is one such taget for mutation. In addition, sigma factors encoded by the other sigma factors (ropS, rpoA, others) can be also targeted. Additional targets for mutation can be transcription factors, ribosomal proteins and factors catalyzing translation of proteins in the host cell.

b) The above specialized libraries of sigma/transcription/other factors are transformed in strains that have exhibited thiophyllic/S—S bond oxidizing activity in prior studies. Such candidate strains include but are not limited to: *Thiobacillus ferrooxidans, T. thiooxidans, Thiobacillus thipparus, Thiobacillus perometabolis, Sulfolobus acidocaldarius, Sulfolobus solfataricus, Rhodococcus rhodochrous, Pyrococcus furiosus*, and *Ceriporiopsis suhvermispora*. Usual transformation methods are used such as electroporation, calcium precipitation, other chemical transformations and similar techniques that would be familiar to someone skilled in the art of molecular biology and cell transformation.

c) The above transformants are exposed to environments simulating the toxic conditions to be encountered during devulcanization, such as solvents and their mixtures, high acidity (low pH), and high concentrations of plasticizers, carbon black, zinc oxide, chemical protective agents, and other similar compounds that have been detected in prior devulcanization studies and shown to be inhibitory to microbial growth. Mutant cells that survive the toxic environment are candidates for further analysis.

d) Mutant cells surviving the above challenges are isolated and the extrachromosomal DNA fragments putatively responsible for their enhanced tolerance phenotype are isolated and sequenced. Mutant sequences are ligated in new vectors and retransformed into host cells with the initial genetic background and exposed to similar high toxicity environments. Transformed cells that recover the tolerance phenotype upon the new transformation are selected and their DNA insert thus confirmed to be capable to elicit the new phenotype.

e) Besides well characterized transformants, other isolates will also be obtained with enhanced tolerance phenotype. They will be similarly isolated for further application.

f) While the above steps are described with respect to a toxicity screening assay, the same method is also applicable to the isolation of mutants and transformants with increased activity for sulfur bond oxidation. The same approach can be used to that end in conjunction with a different high throughput screening assay that identifies mutants with high activity. The above described methods for enzymes can be used in this embodiment as well. In the present invention, cells with activity will be identified on the basis of high sulphate concentrations detected in 96-well plates used for the growth of individual mutant cells.

As seen by the detailed description set forth above, the method of microbial and/or enzymatic devulcanization of rubber of the present invention provides a process and the resulting product of the process in which a previously vulcanized rubber may be incorporated into new polymer compositions for tires and other products at much greater levels than have been utilized in the prior art without any significant loss in product performance. The method of microbial and/or enzymatic devulcanization of rubber of the present invention overcomes the problems associated with prior devulcanization methods that utilize microbial or enzymatic agents set forth above by providing a method for devulcanization of vulcanized rubber crumb that ensures that every part of the ground rubber particle will be exposed to the microbe and/or enzyme and thus devulcanized and which ensures a rate of degradation of the sulfur cross-links which is compatible with use of the method in commercial settings. The method of microbial and/or enzymatic devulcanization of rubber of the present invention causes essentially all S—S and S—C bonds to be broken in the rubber crumb, resulting in a rubber compound that can easily be combined in large quantities, from about 1% to about 40%, with fresh rubber compound causing the rubber and filler content of the particle to fully disburse in the fresh rubber compound on a molecular scale.

It is contemplated that the preferred embodiment method of microbial and/or enzymatic devulcanization of rubber could be utilized with other organic solvents and/or microbes and enzymes without changing the overall concept of the present invention.

Accordingly, the method of microbial and/or enzymatic devulcanization of rubber of the present invention is simplified, provides an effective, safe, inexpensive and efficient product and mtheod which achieves all the enumerated objectives, provides for eliminating difficulties encountered with prior art methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the method for microbial and/or enzymatic devulcanization of rubber of the present invention is used, the characteristics of the arrangement and method steps, and the advantageious, new and useful results obtained; the new and useful elements, process, products, parts, components and combinations are set forth in the appended claims.

What is claimed is:

1. A method of microbial or biological enzymatic devulcanization of rubber comprising:
   providing a particulate vulcanized rubber compound;
   swelling said particulate vulcanized rubber compound in a solvent to significantly expand a network structure of the particulate vulcanized rubber compound; and
   introducing a microbe or biological enzyme into said solvent containing said particulate vulcanized rubber compound in order to devulcanize the compound, wherein an environment of said method does not interfere with a biological activity of said microbe or said biological enzyme, and whereby said swelling of said particulate vulcanized rubber compound ensures that every part of the particulate vulcanized rubber compound is exposed to the microbe or the biological enzyme.

2. A product produced by the method of claim 1.

3. A product produced by the method of claim 1, said product being capable of replacing fresh rubber compounds.

4. A product produced by the method of claim 1, said product being capable of replacing about 1% to about 40% of fresh rubber compounds in tire manufacturing.

5. The method of claim 1, wherein said microbe or biological enzyme is identified by using high throughput screens.

6. The method of claim 1, wherein said microbe or biological enzyme is developed for optimal devulcanization by mutation using a process selected from the group consisting of polymerase chain reaction, gene shuffling, transcription engineering and random mutation using chemical, biological or other mutagens.

7. The method of claim 6, wherein said microbe or biological enzyme is identified by using high throughput screens.

8. The method of claim 1, wherein said microbe or biological enzyme is developed for improved tolerance to said solvent by mutation using a process selected from the group consisting of polymerase chain reaction, gene shuffling, transcription engineering and random mutation using chemical, biological or other mutagens.

9. The method of claim 8, wherein said microbe or biological enzyme is identified by using high throughput screens.

10. The method of claim 1 wherein said solvent is a pure solvent or mixture of solvents.

11. The method of claim 1 wherein said solvent is identified by using high throughput screens.

12. The method of claim 1, wherein said particulate vulcanized rubber compound is provided through grinding or shaving a vulcanized rubber compound.

13. The method of claim 1, further comprising:
    removing or deactivating a residue generated from said devulcanization of said particulate vulcanized rubber compound.

14. The method of claim 1, wherein said devulcanization of said particulate vulcanized rubber compound comprises breaking a sulfur-sulfur or sulfur-carbon bond.

15. The method of claim 1, wherein said solvent is selected from the group consisting of hexane, toluene, and benzene.

16. The method of claim 1, wherein said particulate vulcanized rubber compound comprises a natural rubber or a synthetic rubber.

17. The method of claim 6, wherein said optimal devulcanization is determined by measuring the reaction products generated by said devulcanization.

18. The method of claim 6 wherein said optimal devulcanization is determined by imaging techniques which detect an increased solvent swelling resulting from a reduced cross-link density due to said devulcanization.

19. The method of claim 1, further comprising:
    pre-treating said vulcanized rubber compound to remove or deactivate a toxic chemical from said rubber compound prior to devulcanization of the rubber compound.

* * * * *